United States Patent
Hara et al.

(10) Patent No.: US 6,789,074 B1
(45) Date of Patent: Sep. 7, 2004

(54) DATABASE PROCESSING METHOD AND APPARATUS, AND MEDIUM FOR RECORDING PROCESSING PROGRAM THEREOF

(75) Inventors: Norihiro Hara, Kawasaki (JP); Masashi Tsuchida, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/448,513

(22) Filed: Nov. 24, 1999

(30) Foreign Application Priority Data

Nov. 25, 1998 (JP) ............................................ 10-333585

(51) Int. Cl.$^7$ ............................................ G06F 17/30
(52) U.S. Cl. ............................................ 707/4
(58) Field of Search ............................ 707/1–4, 104.1

(56) References Cited

U.S. PATENT DOCUMENTS

| | | | | |
|---|---|---|---|---|
| 5,742,810 A | * | 4/1998 | Ng et al. ........................ | 707/10 |
| 5,754,841 A | * | 5/1998 | Carino, Jr. ........................ | 707/3 |
| 5,765,147 A | * | 6/1998 | Mattos et al. ................... | 707/2 |
| 5,781,910 A | * | 7/1998 | Gostanian et al. ........... | 707/201 |
| 5,794,250 A | * | 8/1998 | Carino et al. ................ | 707/100 |
| 5,806,061 A | * | 9/1998 | Chaudhuri et al. ............. | 707/3 |
| 5,826,077 A | * | 10/1998 | Blakeley et al. ................ | 707/4 |
| 5,857,182 A | * | 1/1999 | DeMichiel et al. ............. | 707/1 |
| 5,864,843 A | * | 1/1999 | Carino et al. ................... | 705/35 |
| 5,956,706 A | * | 9/1999 | Carey et al. .................... | 707/2 |
| 5,995,958 A | * | 11/1999 | Xu ................................ | 707/3 |
| 6,067,542 A | * | 5/2000 | Carino, Jr. ................... | 707/102 |
| 6,192,370 B1 | * | 2/2001 | Primsch ................... | 707/103 R |
| 6,199,059 B1 | * | 3/2001 | Dahan et al. ............... | 707/102 |
| 6,278,994 B1 | * | 8/2001 | Fuh et al. .................... | 707/102 |
| 6,321,235 B1 | * | 11/2001 | Bird ........................... | 707/203 |
| 6,324,683 B1 | * | 11/2001 | Fuh et al. | |
| 6,424,991 B1 | * | 7/2002 | Gish .......................... | 709/203 |

* cited by examiner

*Primary Examiner*—Greta Robinson
*Assistant Examiner*—Sathyanaraya Pannala
(74) *Attorney, Agent, or Firm*—Antonelli, Terry, Stout & Kraus, LLP (57) ABSTRACT

There is provided such a technique that database processing of accessing a specific DB resource can be conducted efficiently. When invoking a module for implementing a function related to a data type of a query subject, and conducting database processing, a query given by a user is analyzed. It is determined whether database resource access information of a module for implementing a function in the query given by the user indicates that access to a specific database resource should be conducted. If it is indicated that access to a specific database resource should be conducted, then an execution procedure is determined so as to execute the module in a database processing apparatus storing and managing the database resource.

10 Claims, 9 Drawing Sheets

UDT FUNCTION IMPLEMENTATION
MODULE DEFINITION INFORMATION  52

| MODULE NAME 522 | UDT NAME 523 | MODULE CALLING TRIGGER 524 | MODULE CALLING UDT FUNCTION NAME 525 | DB RESOURCE ACCESS FLAG 526 |
|---|---|---|---|---|
| _p_text_contains | TEXT | AS_FUNCTION | TEXT_CONTAINS | ON |
| _p_text_extract1 | TEXT | AS_FUNCTION | TEXT_EXTRACT1 | ON |
| _p_text_extract2 | TEXT | AS_FUNCTION | TEXT_EXTRACT2 | OFF |
| _p_text_insert | TEXT | AS_INSERT_TRIGGER | — | ON |
| _p_text_delete | TEXT | AS_DELETE_TRIGGER | — | ON |
| ..... | ... | ..... | ..... | ... |

QUERY EXECUTION
PROCEDURE DIRECTIVE 700

QUERY EXECUTION PROCEDURE
DIRECTIVE (PARTIAL DETAILS) 720a

Scan movies_lib

| DIRECTIVE INSTRUCTION | INFORMATION | |
|---|---|---|
| REPETITIVE EXECUTION | REPETITION id | LOOP1 |
| | REPEAT UNTIL TAKE OUT TABLE DATA DISAPPEARS | |
| SCAN (1 TABLE DATA ACCESS) | TABLE | movies_lib |
| | TAKE OUT DATA | guide,title |
| FUNCTION INVOKE | INVOKE MODULE | _p_text_contains |
| | PARAMETER INFORMATION | guide,'independence' |
| CONDITION DECISION | IS, FUNCTION TEXT_CONTAINS RESULT, TRUE | |
| FUNCTION INVOKE | INVOKE MODULE | _p_text_extract1 |
| | PARAMETER INFORMATION | guide, 'TEXT' |
| RESULT TRANSFER | TRANSFER DATA 1 | RESULT OF TEXT_EXTRACT1 |
| | | title DATA |
| | | ROW IDENTIFIER |
| | TRANSFER DESTINATION | BES(103c) |
| REPETITION END | REPETITION id | LOOP1 |

FIG. 8

QUERY EXECUTION PROCEDURE
DIRECTIVE (PARTIAL DETAILS)   730a

Scan books_lib

| DIRECTIVE INSTRUCTION | INFORMATION | |
|---|---|---|
| REPETITIVE EXECUTION | REPETITION id   LOOP2 | |
| | REPEAT UNTIL TAKE OUT TABLE DATA DISAPPEARS | |
| SCAN (1 TABLE DATA ACCESS) | TABLE | books_lib |
| | TAKE OUT DATA | guide, publish year, title |
| CONDITION DECISION | = DECISION | publish_year  1997 |
| RESULT TRANSFER | TRANSFER DATA 2 | title DATA |
| | | ROW IDENTIFIER |
| | TRANSFER DESTINATION | BES (103c) |
| REPETITION END | REPETITION id | LOOP2 |

QUERY EXECUTION PROCEDURE
DIRECTIVE (PARTIAL DETAILS)   710a

Join

| DIRECTIVE INSTRUCTION | INFORMATION | |
|---|---|---|
| REPETITIVE EXECUTION | REPETITION id   LOOP2 | |
| | REPEAT UNTIL MATCHING DATA DISAPPEARS | |
| MATCHING PROCESSING | MATCHING DATA | movies_lib.title books_lib.title |
| | MATCHING CONDITION | = CONDITION |
| FUNCTION INVOKE | INVOKE MODULE | _p_text_extract2 |
| | PARAMETER INFORMATION | books_lib.guide |
| RESULT TRANSFER | TRANSFER DATA 3 | movies_lib.title |
| | | TEXT_EXTRACT1 RESULT |
| | | TEXT_EXTRACT2 RESULT |
| | TRANSFER DESTINATION | FES |
| REPETITION END | REPETITION id | LOOP2 |

FIG. 9

DATABASE PROCESSING METHOD AND APPARATUS, AND MEDIUM FOR RECORDING PROCESSING PROGRAM THEREOF

BACKGROUND OF THE INVENTION

The present invention relates to a database processing system allowing a user to define a data type and its behavior, and in particular to a technique which is effective for application to a database processing system for efficiently accessing a specific database resource using a user-defined function.

Recently in the field of database management system, the demand for managing multimedia data such as documents and images as a database occurs in the context of the hardware progress and spread of the WWW (World Wide Web). Therefore, the function of arbitrarily defining and managing complicated data which cannot be managed by the conventional relational database management system has become necessary.

In order to satisfy the demand, standardization of SQL3 (ISO, ANSI) is now being advanced in database language SQL (Structured Query Language). UDT (User-Defined Type) is one of principal functions of the SQL3. The UDT is user-defined data type. The object-oriented concept is adopted. Operation for UDT data is also defined by the user as a method (function or procedure). By using the UDT, a complicated data structure can be implemented. Furthermore, behavior of a value itself of UDT data (accompanying function) can be defined as a user-defined function. In the definition of the UDT, a specification of an attribute (group) for representing a value, and a group of operations for representing its behavior are stipulated as a UDT function. It is typical as implementation that these UDT definition information pieces are managed in the database management system as dictionary information in the same way as table definition and so on.

In recent years, a relational database management system adopting the above described object-oriented concept and supporting the function such as user-defined data type is often called object relational database management system.

In the definition of the UDT function, description using the SQL itself is possible. Furthermore, in the definition of this function, it is also possible to describe it by using a general programming language such as the C programming language, compile it, and specify a module registered in the system. Relations between these modules and the UDT functions are described in a type definition statement (CREATE TYPE statement) for defining a UDT. In other words, the module is an internal implementation form of the UDT function. The implementation of the UDT function and the module is described in Don Chamberlin: "Using the new DB2: IBM's Object-Relational Database System", pp. 285, 1966, and so on.

By using the UDT, it becomes possible to implement the function corresponding to multimedia data as a function of the database management system. This means that the processing which has been conducted in the application program until now can be implemented on the database system side at high speed and with a low development cost.

SUMMARY OF THE INVENTION

As the function corresponding to multimedia data referred to herein, a complicated and enhanced retrieval function which is not present in the conventional relational database management system can be mentioned. A retrieval system specific to data such as image, voice, document, and map information typically has an index for satisfying each retrieval function. In the object-relational database management system as well, it becomes necessary to have a certain index or information taking the place thereof, and provide a retrieval function specific to the UDT by accessing those "DB resources" through the UDT function. Because in the UDT function of only processing for UDT data which is column data of a table, such a function as to sufficiently satisfy users needs for multimedia data cannot be implemented. In other words, for acceding to users needs for multimedia data, a DB resource managed under the UDT becomes necessary besides the table data. In the database management system, such a mechanism as to manage such a DB resource becomes necessary.

On the other hand, a different charm of the object-relational database management system is in that existing data existing on the relational database management system can be employed efficiently as they are, i.e., in table form retrieval which is the merit of the relational model. In other words, synthetic retrieval related to column data in the same of different table is possible.

In the case where a UDT function having a DB resource as described above and implementing a function by accessing the DB resource has been introduced, a place where a UDT function implementing module is executed (invoked) is limited to the place (server) where the DB resource is present. Therefore, the optimizer of the object-relational database management system must conduct planning so as to necessarily invoke the UDT implementation module in a table storing BES (Back End Server) where there might be DB resource access. This results in a problem that the execution performance such as a query accompanied by matching processing of a plurality of rows is not sufficiently obtained, and effects of the relational model cannot be sufficiently given.

An object of the present invention is to provide a technique capable of solving the above described problem and efficiently conducting database processing of accessing a specific DB resource.

In accordance with the present invention, a database processing system for starting a module to implement a function related to a data type of a query subject and conducting database processing is so adapted that when a module for implementing a function in the query given by the user accesses a specific DB resource, an execution procedure is determined so as to execute the module in a database processing apparatus which is storing and managing the database resource.

In the database processing system of the present invention, when registering module definition information of a module for implementing a function related to a data type defined in a database, DB resource access information indicating whether the module should access a DB resource specific to its data type is registered.

When receiving a query given by a user and conducting corresponding database processing, the query is analyzed and DB resource access information of the module for implementing a function included in the query is referred to. If the information indicates that access to the specific DB resource should be conducted, then an execution procedure is determined so as to execute the module in a database processing apparatus which is storing and managing the database resource.

If the information indicates that access to the specific DB resource should not be conducted, then an execution procedure is determined so as to execute the module in a database processing apparatus having a lowest module execution frequency or a database processing apparatus having no relation to the database processing apparatus which is storing and managing the DB resource.

In the database processing system of the present invention, a module for accessing a specific DB resource is executed in a database processing apparatus which is storing and managing the DB resource whereas modules other than the module are executed in other database processing apparatuses, as heretofore described. Therefore, database processing of accessing the specific DB resource can be conducted efficiently.

DESCRIPTION OF THE EMBODIMENTS

Hereafter, a database processing system of an embodiment for efficiently accessing a specific database resource by using a user-defined function.

Figure 1:
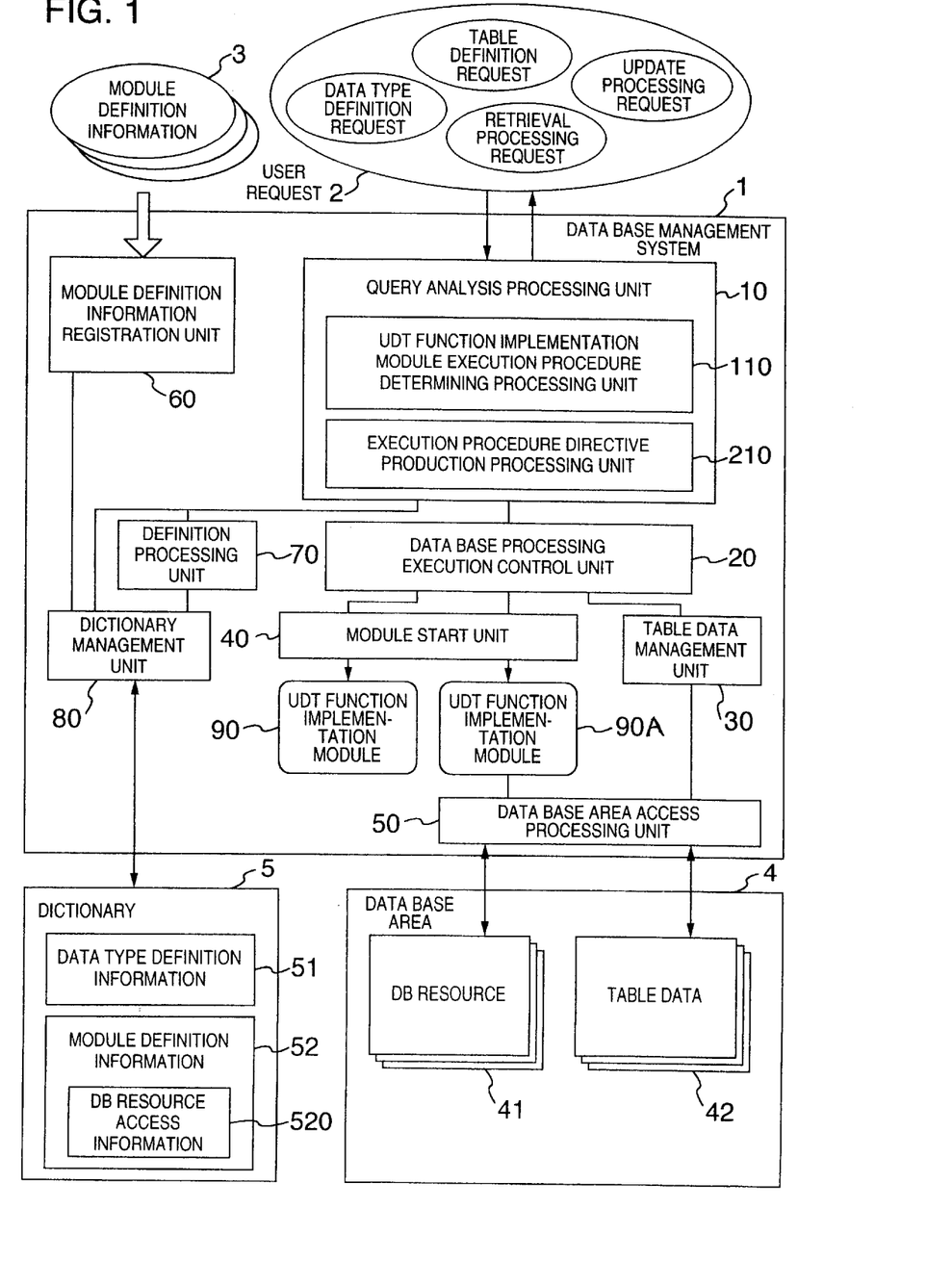
FIG. 1 is a diagram showing a schematic configuration of a database processing system of an embodiment.

FIG. 1 is a diagram showing the schematic configuration of a database processing system of the present embodiment. As shown in FIG. 1, a database management system 1 of the present embodiment includes a module definition information registration unit 60, a UDT function implementation module execution procedure determining processing unit 110, and an execution procedure directive production processing unit 210.

The module definition information registration unit 60 is a processing unit for registering DB resource access information 520 indicating whether a module implementing a function relating to a data type defined in a database accesses a specific DB resource.

In the case where the DB resource access information 520 of a module for implementing a function included in a query given by the user indicates that a specific DB resource should be accessed, the UDT function implementation module execution procedure determining processing unit 110 determines an execution procedure so as to execute the module in a database processing apparatus in which the DB resource is stored and managed. The execution procedure directive production processing unit 210 is a processing unit for producing a query execution procedure directive according to a result determined by the UDT function implementation module execution procedure determining processing unit 110.

A program for making the database management system 1 function as the module definition information registration unit 60, the UDT function implementation module execution procedure determining processing unit 110, and the execution procedure directive production processing unit 210 is recorded on a recording medium such as a CD-ROM, and stored in a magnetic disk or the like, and thereafter loaded in a memory and executed. The medium for recording the program thereon may be another media than the CD-ROM.

By referring to FIG. 1, the concept of the present embodiment will be described briefly. In a query analysis processing unit 10 included in the database management system 1 of the present embodiment, the UDT function implementation module execution procedure determining processing unit 110 determines when and where a UDT function implementation module should be executed, according to the DB resource access information 520 concerning the UDT function implementation module contained in a user query of user requirements 2, and on the basis of a result of the determination, the execution procedure directive production processing unit 210 produces a query execution procedure directive. By invoking the module in accordance with the query execution procedure directive, a database processing execution control unit 20 executes a UDT function.

By referring to FIG. 1, the configuration of the database management system of the present embodiment will now be described in detail. The database management system 1 of the present embodiment includes a query analysis processing unit 10, a database processing execution unit 20, a table data management unit 30, a module invoke unit 40, a database area access processing unit 60, a definition processing unit 70, and a dictionary management unit 80. The query analysis processing unit 10 receives a SQL (structured query language) which is a database query request supplied from the user, conducts optimization processing for determining an optimum access route of database access through syntax analysis and semantic analysis processing, and generates an internal processing code for database processing, i.e., a query execution procedure directive on the basis of the determined access route. The database processing execution control unit 20 controls the database access on the basis of the generated query execution procedure directive. The table data management unit 30 conducts access control on table data 42 through the database area access processing unit 50 in response to a request directive given by the database processing execution control unit 20. The module start unit 40 starts a UDT function implementation module 90 in response to a request directive given by the database processing execution control unit 20. The module start unit 40 starts UDT function implementation modules 90, 90A in response to a request directive given by the database processing execution control unit 20 in the same way. The database area access processing unit 50 conducts access control on a database area 4 storing a DB resource 41 and the table data 42, in response to a request directive of the table data management unit 30 or the module start unit 40. The module definition information registration unit 60 accepts and analyzes module definition information concerning the UDT function implementation module inputted from the user, and requests registration into a dictionary 5. The definition processing unit 70 requests registration or deletion with respect to the dictionary 5 on the basis of a result of the analysis conducted by the query analysis processing unit 10, in the case where the user request is one of various definition requests. The dictionary management unit 80 conducts registration processing, reference processing, or deletion processing.

In the dictionary 5, various kinds of definition information such as definition information concerning tables and indexes are stored beforehand. The definition information stored in the dictionary 5 includes data type definition information 51 and module definition information 52.

The data type definition information 51 is definition information concerning a UDT, i.e., information concerning a data type forming the UDT, and a UDT function for implementing the behavior of the UDT. The data type definition information 51 has been inputted by the user by means of a data type definition request of the user request 2.

The module definition information 52 is information representing which module is started at the time of implementation of which UDT function in response to what. In addition, the module definition information 52 includes DB resource access information 520 which is information concerning the DB resource access at the time of start of that module. The module definition information 52 has been inputted from the user by means of module definition information 3.

Figure 2:
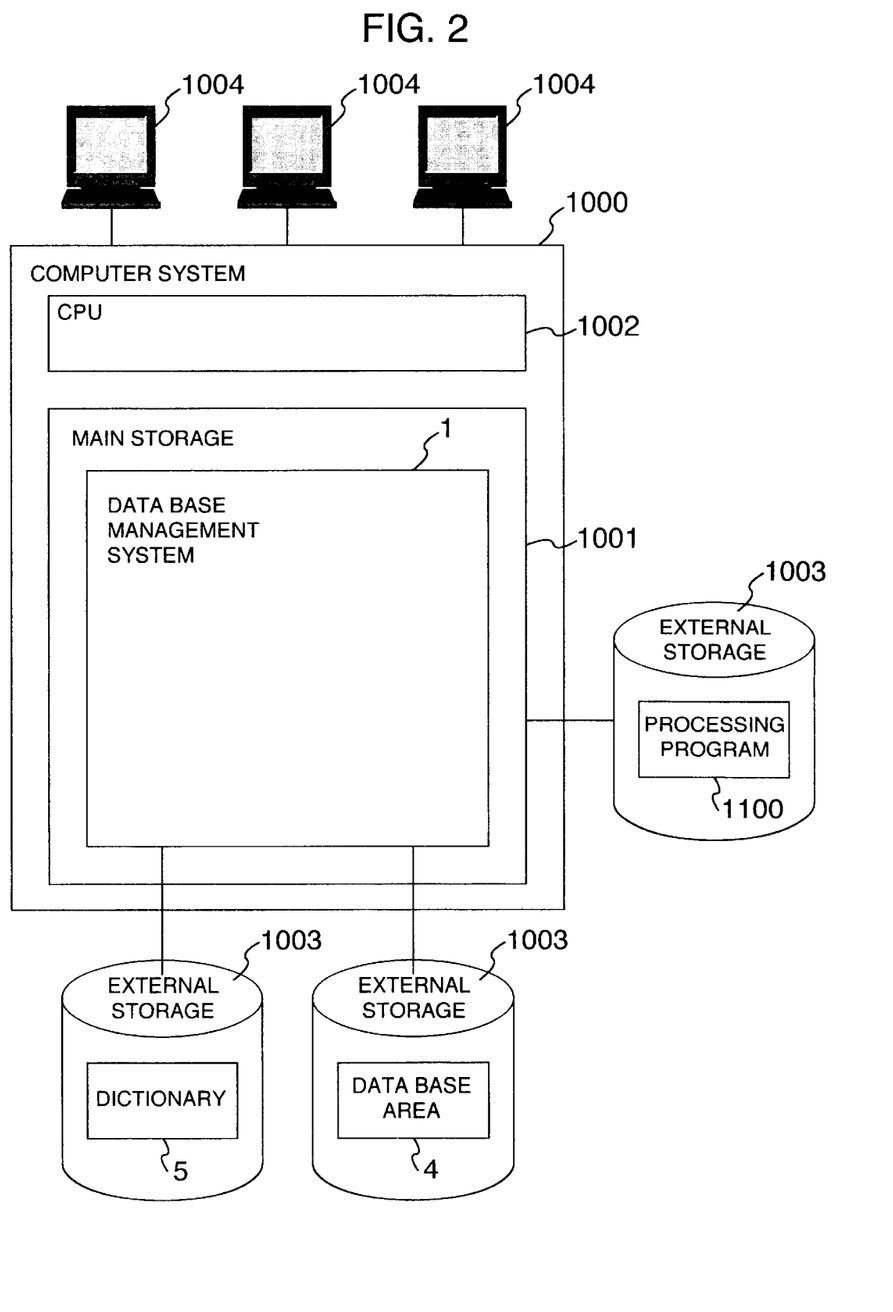
FIG. 2 is a diagram showing an example of a hardware configuration of a computer system of the embodiment.

FIG. 2 is a diagram showing an example of a hardware configuration of a computer system of the present embodiment. A computer system 1000 includes a CPU 1002, a main storage 1001, external storages 1003 such as magnetic disks, and a large number of terminals 1004. On the main storage 1001, the database management system 1 described earlier by referring to FIG. 1 is placed. On the external storages 1003, a dictionary 5 including various kinds of definition concerning the database managed by the database managed by the database management system 1, and a database area 4 including defined table data and a DB resource accessed by the UDT function implementation module. Furthermore, a program implementing the database management system 1 is also stored on an external storage 1003.

Figure 3:
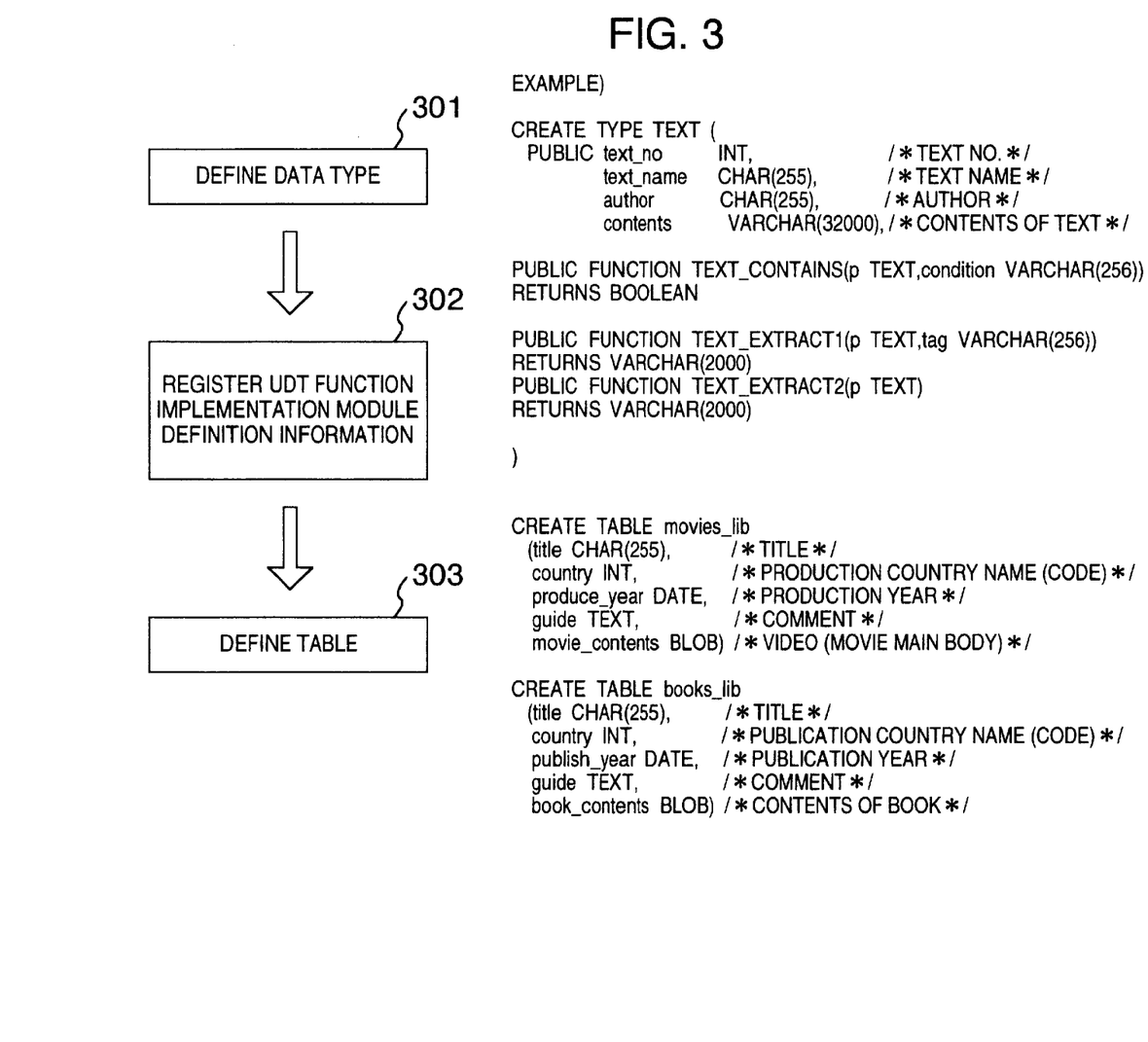
FIG. 3 is a diagram showing an example of addition of a data type of the embodiment.

FIG. 3 is a diagram showing an example of addition of a data type in the present embodiment. A procedure used when the user adds a new data type to the database management system will now be described by referring to a typical procedure example of FIG. 3. The outline of the procedure becomes as described below.

(1) Data type definition (procedure 301);
(2) UDT implementation module definition information registration (procedure 302); and
(3) Table definition (procedure 303).

First of all, in the data type definition (procedure 301), information concerning a data type to be added is registered. Data type definition is conducted by "CREATE TYPE statement" of SQL. In the example of "CREATE TYPE statement" of FIG. 3, a "TEXT" type UDT having attributes of "text_no", "text_name", "author" and "contents" respectively of INT, CHAR, CHAR and VARCHAR types and a UDT function CONTAINS for returning a BOOLEAN type is defined.

As regards the UDT defined in data type definition of the procedure 301, registration of the UDT implementation module definition information is conducted in the procedure 302. Hereafter, an example of a user interface at the time of registration of the UDT implementation module definition information based upon the data type definition of FIG. 3 will be shown.

UDT name: TEXT

```
UDT name: TEXT
{
_p_text_contains{
        module calling trigger: AS_FUNCTION,
        UDT function name: TEXT_CONTAINS
        DB resource access: YES
}
_p_text_extract1{
        module calling trigger: AS_FUNCTION,
        UDT function name: TEXT_EXTRACT1
        DB resource access: YES
}
_p_text_extract2{
        module calling trigger: AS_FUNCTION,
        UDT function name: TEXT_EXTRACT2
        DB resource access: NO
}
_p_text_insert{
        module calling trigger: AS_INSERT_TRIGGER
        UDT function name: NULL
        DB resource access: YES
}
_p_text_delete{
        module calling trigger: AS_DELETE_TRIGGER
        UDT function name: NULL
        DB resource access: YES
}
}
```

First of all, the name of the related UDT is indicated in "UDT name" as TEXT. Thereafter, information concerning individual modules is shown. The module "_p_text_contains" indicates that it is invoked to implement the UDT function "TEXT_CONTAINS". In a module for implementing the UDT function, "AS_FUNCTION" is specified as the module calling trigger.

"DB resource access" YES indicates a declaration that the module for implementing the UDT function accesses the DB resource specific to that UDT at the time of execution of invoke. In the same way, the module "_p_text_extract1" indicates that it is invoked to implement the UDT function "TEXT_EXTRACT1". In a module for implementing the UDT function, "AS_FUNCTION" is specified as the module calling trigger. This module indicates that access to the DB resource specific to the UDT is required. The module "_p_text_extract2" indicates that it is invoked to implement the UDT function "TEXT_EXTRACT2". In a module for implementing the UDT function, "AS_FUNCTION" is specified as the module calling trigger. This module specifies that access to the DB resource specific to the UDT should be not conducted by means of "DB resource access" NO.

The module "_p_text_insert" indicates that it is invoked when TEXT type data is inserted. ("AS_INSERT_TRIGGER" indicates that the time of insertion is the module calling trigger.) Furthermore, the module "_p_text_delete" indicates that it is invoked when a row including TEXT type data is deleted. ("AS_DELETE_TRIGGER" indicates that the time of deletion is the module calling trigger.) Both the module "_p_text_insert" and the module "_p_text_delete" indicate that access to the DB resource is required in module execution.

By the data type definition (the procedure 301) and the UDT function implementation module definition information registration (the procedure 302) heretofore described, the database management system recognizes the UDT function implementation module. According to a UDT function under query from the user, a corresponding module is invoked in a suitable place, and the module accesses the DB resource. As a result, information for implementing a specific function has become ready.

Under the above described definition of the UDT, a table to be stored in the database area is defined by using a procedure 303 hereafter described. The table definition is conducted in the SQL by the "CREATE TABLE statement" as in an example of the procedure 303 of FIG. 3. In this example, a "movies_lib" table formed of columns of CHAR, INT, DATE, TEXT, and BLOB types represented as "title", "country", "produce_year", "guide", and "movie_contents" is defined. Furthermore, a "books_lib" table formed of columns of CHAR, INT, DATE, TEXT, and BLOB types represented as "title", "country", "publish_year", "guide", and "book_contents" is defined.

Figure 4:
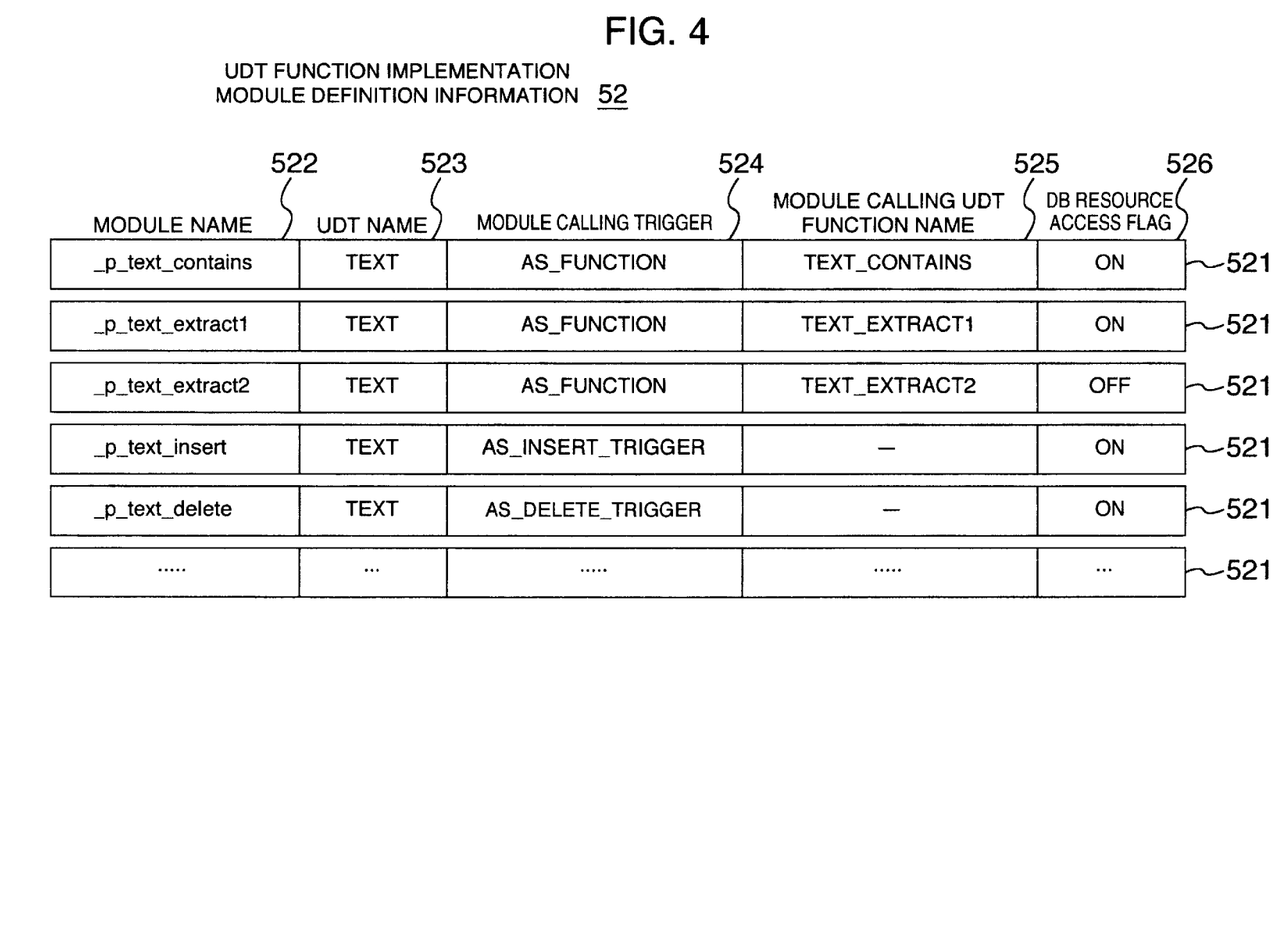
FIG. 4 is a diagram showing an example of a configuration of UDT function implementation module definition information 52 of the embodiment.

FIG. 4 is a diagram showing a configuration example of the UDT function implementation module definition information 52 of the present embodiment. In FIG. 4, a form of the configuration of the UDT function implementation module definition information 52 stored in the dictionary 5 is represented. The UDT function implementation module definition information is definition information concerning a module for implementing the user definition data type (UDT) as already described.

As shown in FIG. 4, the UDT function implementation module definition information 52 includes as many module definition information records 521 as the UDT function implementation modules 90 for each UDT. Each of the module definition information records 521 is formed of a module name, a UDT name, a start trigger, a start UDT function name, and a DB resource access flag, which relate to a certain UDT function implementation module 90.

A UDT name 523 indicates the UDT its relating module (identified by a module name 522) is started in order to implement the behavior of which, or indicates the UDT its relating module is invoked when manipulation for which has been conducted.

If its relating module is a module for implementing the behavior of the UDT, i.e., a module for implementing a UDT function explicitly described in response to a query of the user request 2, then "AS_FUNCTION" is set in a module calling trigger 524 according to user specification, and a UDT function name relating to the module name 522 is indicated in a module calling UDT function name 525.

If the module calling trigger 524 is "AS_INSERT_TRIGGER", then a corresponding module is invoked when table data including that UDT has been inserted. If the module calling trigger 524 is "AS_DELETE_TRIGGER", then a corresponding module is invoked when table data including that UDT has been deleted. If the module calling trigger 524 is "AS_UPDATE_TRIGGER", then a corresponding module is invoked when data of that UDT has been updated by table data updating.

Here, a DB resource access flag 526 is a flag indicating whether a DB resource specific to a relating UDT should be accessed when a module is started and executed. If the DB resource access flag is ON, then it is indicated that access to the DB resource should be conducted. If the DB resource access flag is OFF, then it is indicated that access to the DB resource should not be conducted.

Figure 5:
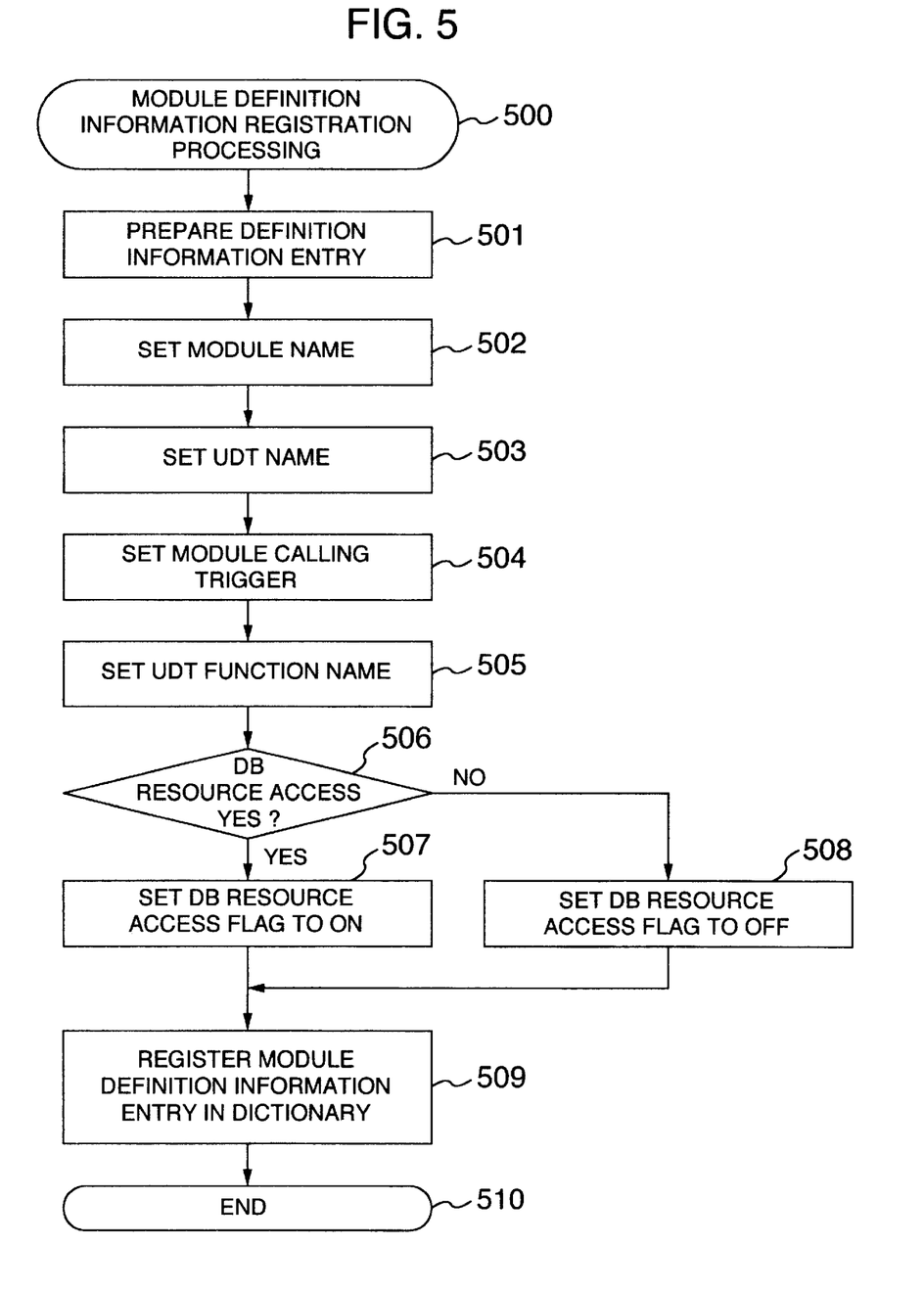
FIG. 5 is a flow chart showing a processing procedure of a module definition information registration unit 60 of the embodiment.

FIG. 5 is a flow chart showing a processing procedure of the module definition information registration unit 60 of the present embodiment. FIG. 5 shows an example of a processing flow in the module definition information registration unit 60, which executes the UDT function implementation module definition information registration (302) described by referring to FIG. 3.

On the basis of the module definition information 3 inputted by the user, the following processing is conducted for each module. First of all, at step 501, a definition information entry for the module definition information to be registered is prepared. Items are set one after another for that entry as described below. Every information forming the base of those items is module definition information inputted from the user. At step 502, a module name is set. At step 503, a UDT the behavior of which is defined by that module is set. Furthermore, at step 504, a trigger whereby that module is invoked is set according to the input information. At step 505, a UDT function name is set.

Furthermore, at step 506, a DB resource access flag 526 which is DB resource access information 520 is set on the basis of the module definition information inputted by the user. At the step 506, it is determined whether the "DB resource access" of the module definition information inputted by the user is YES. In the case of YES, the processing proceeds to step 507, where the DB resource access flag is set to ON. In the case of NO, the processing proceeds to step 508, where the DB resource access flag is set to OFF.

In both cases, all of entry item setting have been completed by the processing heretofore described. At step 509, therefore, the module definition information entry thus set is registered in the dictionary through service of the dictionary management unit 80. As a matter of course, it is sufficient if all items necessary for the module definition information entry are set. The setting order of them need not coincide with that shown in FIG. 5.

An actual example of a module definition information entry registered in the dictionary in accordance with an example of a user interface at the time of registration of the above described UDT implementation module definition information is shown in FIG. 4. Since the module "_p_text_extract2" is defined as NO in DB resource access, the item "DB resource access flag" of the entry is OFF.

Figure 6:
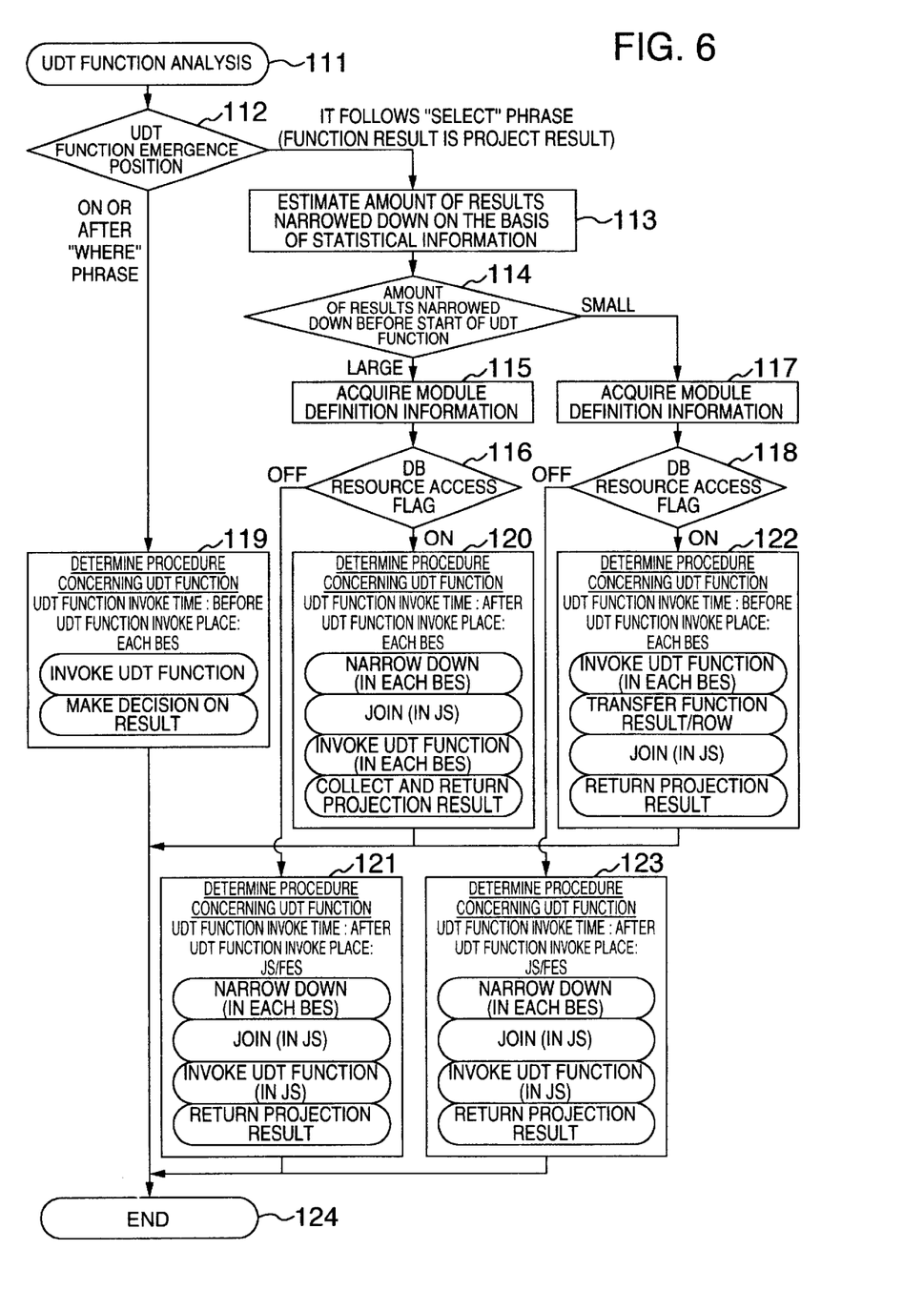
FIG. 6 is a flow chart showing a processing procedure of a UDT function implementation module execution procedure determining processing unit 110 of the embodiment.

FIG. 6 is a flow chart showing a processing procedure of the UDT function implementation module execution procedure determining processing unit 110 of the present embodiment. FIG. 6 shows contents of processing of the UDT function implementation module execution procedure determining processing unit 110 in the case where a UDT function has been detected in the user request 2 (SQL statement) by the query analysis processing unit 10.

In the analysis of the UDT function, determination is made so as to generate a query execution procedure optimum to a module for implementing the UDT function, on the basis of the function DB resource access flag. First of all, it is determined at step 112 where the emergence position of the UDT function in the SQL statement is. If the emergence position of the UDT function is on or after "where" phrase, then the processing proceeds to step 119, where the following procedure concerning the UDT function is determined.

(a) UDT function invoke time: before (b) UDT function invoke place: each BES

In other words, it is determined that the UDT function implementation module should be started in a BES (Back End Server) where table data exists as data of decision subject, "before" decision processing of the "where" phrase. The UDT function implementation module is adapted to table data taken out by various scans (such as a table scan for taking out table data successively one by one, and an index scan for taking out only table data satisfying conditions by using an index). And a decision is made on the result.

Here, the BES refers to a database server having a database area where table data is stored and mainly taking charge of access to the table data.

On the other hand, a database server which mainly accepts a query from the user, conducts an analysis, produces a query procedure directive, requests the BES to execute the query, and returns its result to the user is herein referred to as FES (Front End Server). Furthermore, a database server having a dictionary and taking charge of registration and acquisition of various kinds of definition information is herein referred to as DS (Dictionary Server). The above described server configuration can also be adapted to a parallel database management system in which table data are divisionally disposed in a plurality of BESs and respective BESs conduct database access in parallel, whereby result return is conducted at high speed. As heretofore described, the UDT function analysis processing is completed at step 124.

If at step 112 the emergence position of the UDT function follows a "SELECT" phrase, i.e., the function result is a projection subject, then the processing proceeds to step 113, where the amount of results narrowed down is estimated on the basis of statistical information. If at step 114 the amount of results narrowed down is estimated to be large, then the processing proceeds to step 115, where module definition information of a corresponding module is requested from the dictionary management unit 80 and acquired. Subsequently, at step 116, a decision is made on the DB resource access flag included in the module definition information. If the DB resource access flag is ON, then the processing proceeds to step 120, where the following procedure concerning the UDT function is determined.

(a) UDT function invoke time: after
(b) UDT function invoke place: each BES

In other words, it is determined that data of a corresponding UDT column should be taken out from table data and "thereafter" the UDT function implementation module should be invoked in that BES by using that UDT data as a parameter for the UDT function implementation module. The reason why the procedure is determined in this way is that access to the DB resource is necessary.

In the case of matching processing of a plurality of tables, narrowing down is first conducted in each BES, and thereafter join processing is conducted in a JS. The JS is a server taking charge of the join processing. For reasons of load diversification, a server different from the BES in which the table data exists is determined to be the JS in many cases. Thereafter, in each BES where the table data finally narrowed down as a result of the join exists, the place is temporarily moved and the UDT function implementation module is executed. Because the amount of data finally narrowed down as the result of join is estimated to be sufficiently small. Therefore, retransfer of the UDT data to each BES is considered to have little influence on the processing cost. It is determined that a result of the UDT function implementation module should be collected and returned to the FES. As heretofore described, the UDT function analysis processing is completed at the step 124.

If the DB resource access flag in the module definition information is judged at the step 116 to be OFF, then the processing proceeds to step 121, where the following procedure concerning the UDT function is determined.

(a) UDT function invoke time: after
(b) UDT function invoke place: JS/FES

In other words, it is determined that data of a corresponding UDT column should be taken out from table data and "thereafter" the UDT function implementation module should be started in the JS or FES with respect to the finally narrowed down result. It means that access to the DB resource is not necessary and consequently a module invoke server can be selected flexibly by taking the module start and the UDT data transfer as well into consideration.

In the case of matching processing of a plurality of tables, narrowing down is first conducted in each BES, and thereafter join processing is conducted in a JS. Thereafter, with respect to the table data finally narrowed down as a result of join, the UDT function implementation module is executed in that JS. Because the amount of data finally narrowed down as the result of join is sufficiently small, and consequently it is estimated that the total load of the module start poses no problem. And it is determined that the result should be returned to the FES. As heretofore described, the UDT function analysis processing is completed at the step 124.

If it is estimated at the step 114 that the amount of the result narrowed down is small, the processing proceeds to step 117. At the step 117, module definition information of a corresponding module is requested from the dictionary management unit 80, and acquired. Subsequently, at step 118, a decision is made on the DB resource access flag included in the module definition information. If the DB resource access flag is ON, then the processing proceeds to step 122, where the following procedure concerning the UDT function is determined.

(a) UDT function invoke time: before
(b) UDT function invoke place: each BES

In other words, the UDT function implementation module is invoked "before" narrowing down is conducted finally. And it is determined that when data of a corresponding UDT column is taken out from the table data, invoking should be conducted in that BES by using that UDT data as a parameter for the UDT function implementation module. The reason why the procedure is determined in this way is that access to the DB resource is necessary.

In the case of matching processing of a plurality of tables, the UDT data is first taken out in each BES and subsequently the UDT function implementation module is invoked. Its result and the result of narrowing down are transferred to the JS, and final narrowing down, i.e., join processing is conducted. And it is determined that the result should be returned to the FES.

The reason why the UDT function implementation module is determined to be invoked immediately after data is taken out is that the amount of table data in the BES is small and the total load caused by the module invoke is judged to be light. Furthermore, the reason is that the UDT function implementation module needs to access the DB resource existing in the BES. As heretofore described, the UDT function analysis processing is completed at the step 124.

If the DB resource access flag in the module definition information is judged at the step 118 to be OFF, then the processing proceeds to step 123, where the following procedure concerning the UDT function is determined.

(a) UDT function invoke time: after
(b) UDT function invoke place: JS/FES

In other words, it is determined that data of a corresponding UDT column should be taken out from table data and "thereafter" the UDT function implementation module should be invoked in the JS or FES with respect to the finally narrowed down result. It means that access to the DB resource is not necessary and consequently a module invoke server can be selected flexibly by taking the module invoke and the UDT data transfer as well into consideration.

In the case of matching processing of a plurality of tables, narrowing down is first conducted in each BES, and thereafter join processing is conducted in the JS. Thereafter, with respect to the table data finally narrowed down as a result of join, the UDT function implementation module is executed in that JS. Because the amount of data finally narrowed down as the result of join is sufficiently small, and consequently it is estimated that the total load of the module invoke poses no problem. And it is determined that the result should be returned to the FES. As heretofore described, the UDT function analysis processing is completed at the step 124.

By the way, an optimization technique using statistical information described here is nothing but an example. It is important in the present embodiment to use DB resource access information as information for optimization.

On the basis of the analysis result of the present UDT function and other SQL statement analysis results, an execution procedure is generated in the execution procedure directive production processing unit 210 of FIG. 1. By taking the next query statement as an example, the UDT function analysis processing described earlier will now be concretely.

SELECT movies_lib.title,
    TEXT_EXTRACT1(movies_lib.guide,'text'),
    TEXT_EXTRACT2(books_lib.guide)
FROM movies_lib,books_lib
WHERE TEXT_CONTAINS(movies_lib.guide, 'independence') IS
TRUE AND
    books_lib.publish_year=1997 AND
    movies_lib.title=books_lib.title The data type of the "guide" column of the table "movies_lib" and the table "books_lib" is defined by the UDT of TEXT type. As the value of the TEXT type, a document is stored.

The function "TEXT_CONTAINS" is a function which returns TRUE (BOOLEAN type) in the case where specified TEXT type data which is a first parameter contains a character string specified by a second parameter. The function "TEXT_EXTRACT1" is a function which extracts a document corresponding to a tag portion specified by the second parameter in the specified TEXT type data which is the first parameter, and returns it as VARCHAR type data. The function "TEXT_EXTRACT2" is a function which returns all document data included in the specified TEXT type data which is the first parameter. At that time, the tag information is omitted. As understood from the UDT function implementation module definition information of FIG. 4 as well, each of the module "_p_text_contains" and the module "_p text_extract1" respectively implementing the functions "TEXT_CONTAINS" and "TEXT_EXTRACT1" accesses a DB resource specific to the TEXT type at the time of execution. It is now assumed in this example that an index for acquiring an element number corresponding to a tag from its tag name is stored in the DB resource as information beforehand.

The above described example of the SQL statement is a retrieval request. For a title of table data containing "independence" in a "guide" column (comment) of the "movies_lib" table which coincides a title of table data having a "publish_year" column (publication year) of the "books_lib" table equivalent to 1997, the retrieval request makes a request that the title of the "movies_lib", table, "text" in the "guide" column (comment) of the "movies_lib" table, and the full text of the "guide" column (comment) of the "books lib" table should be returned.

The UDT function of the above described SQL statement is analyzed as follows in accordance with a flow shown in FIG. 6. First of all, in the analysis processing of a portion corresponding to the "movies_lib" table, the UDT function "TEXT_CONTAINS" is determined as shown in step 119 of FIG. 6 because it emerges on or after the "where" phrase. Furthermore, as for the UDT function "TEXT_EXTRACT1", it is estimated that narrowing down to a sufficiently few number is effected by narrowing down using "TEXT_CONTAINS", and determination is conducted as shown in the step 122 of FIG. 6. In other words, start of the UDT function "TEXT_EXTRACT1" implementation module is determined to be conducted in each BES before the join processing.

As for the UDT function "TEXT_EXTRACT2" in the analysis processing of a portion corresponding to the "books_lib", table, it is estimated that the amount of the result of narrowing down is reduced finally by the join processing. Furthermore, access to the DB resource is not necessary. Therefore, determination is conducted as shown in the step 123 of FIG. 6. An example of the execution procedure directive generated on the basis of the analysis result is shown in FIGS. 7 and 8.

Figure 7:
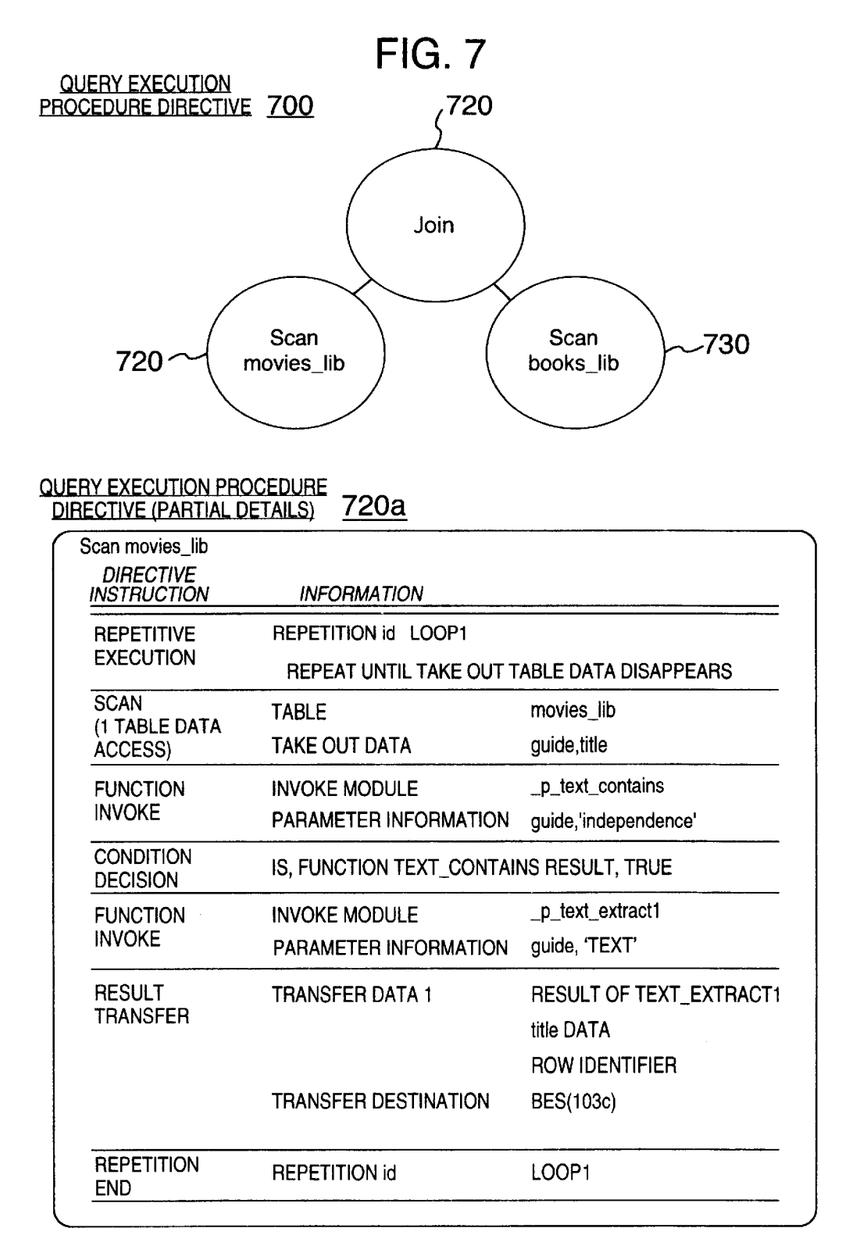
FIG. 7 is a diagram showing an example of an execution procedure directive of the embodiment.

FIG. 7 is a diagram showing an example of an execution procedure directive of the present embodiment. The present SQL statement requires matching processing of two tables. Therefore, a query execution procedure directive 700 is formed of three portions, i.e., scan processing 720 for the table "movies_lib", scan processing 730 for the table "books_lib", and matching processing 710. Partial details 720a of FIG. 7 shows details of the scan processing 720 for the table "movies_lib".

Figure 8:
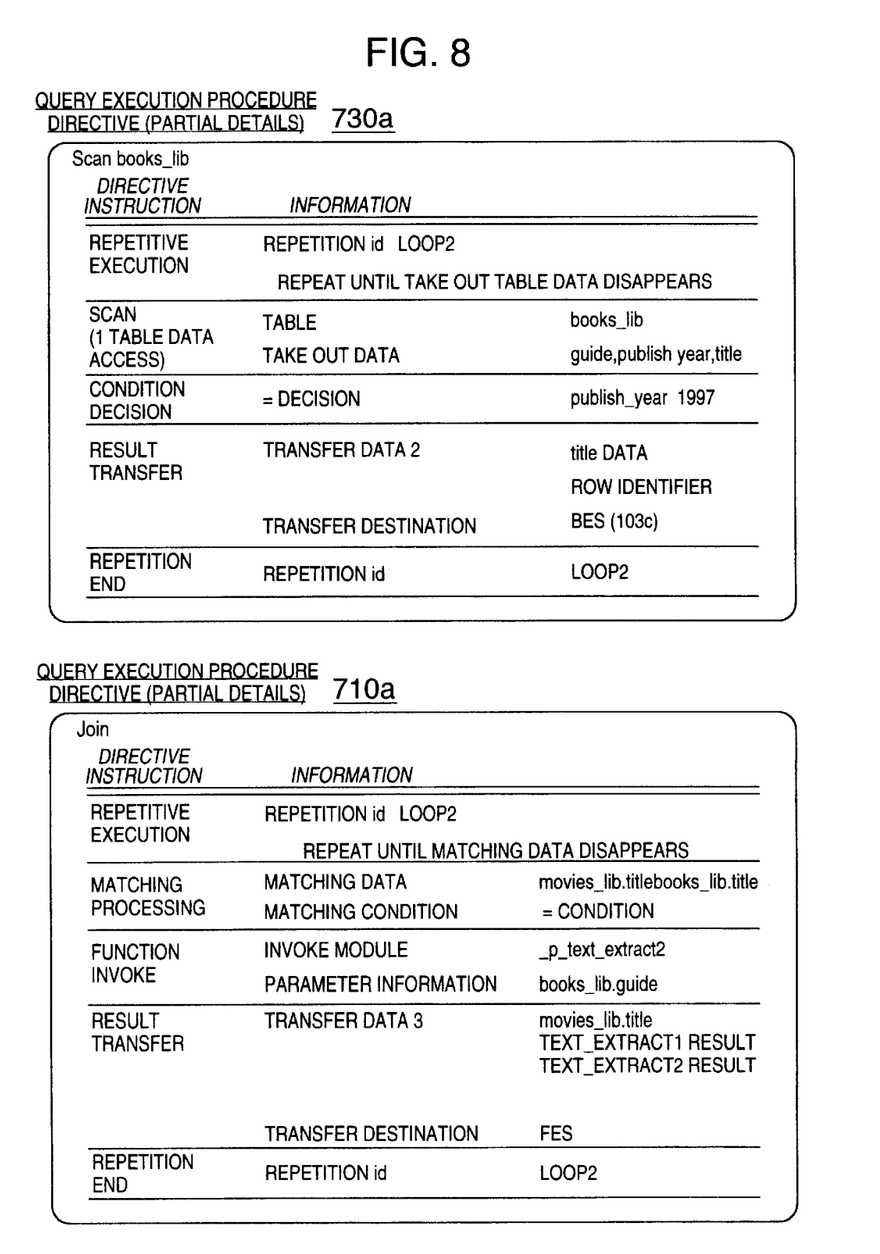
FIG. 8 is a diagram showing details of scan processing 730 and comparison processing 710 of the embodiment.

FIG. 8 is a diagram showing details of the scan processing 730 and the matching processing 710 of the present embodiment. Partial details 730a of FIG. 8 shows details of the scan processing 730 for the table "books_lib". Partial details 710a of FIG. 8 shows details of the matching processing 710.

Figure 9:
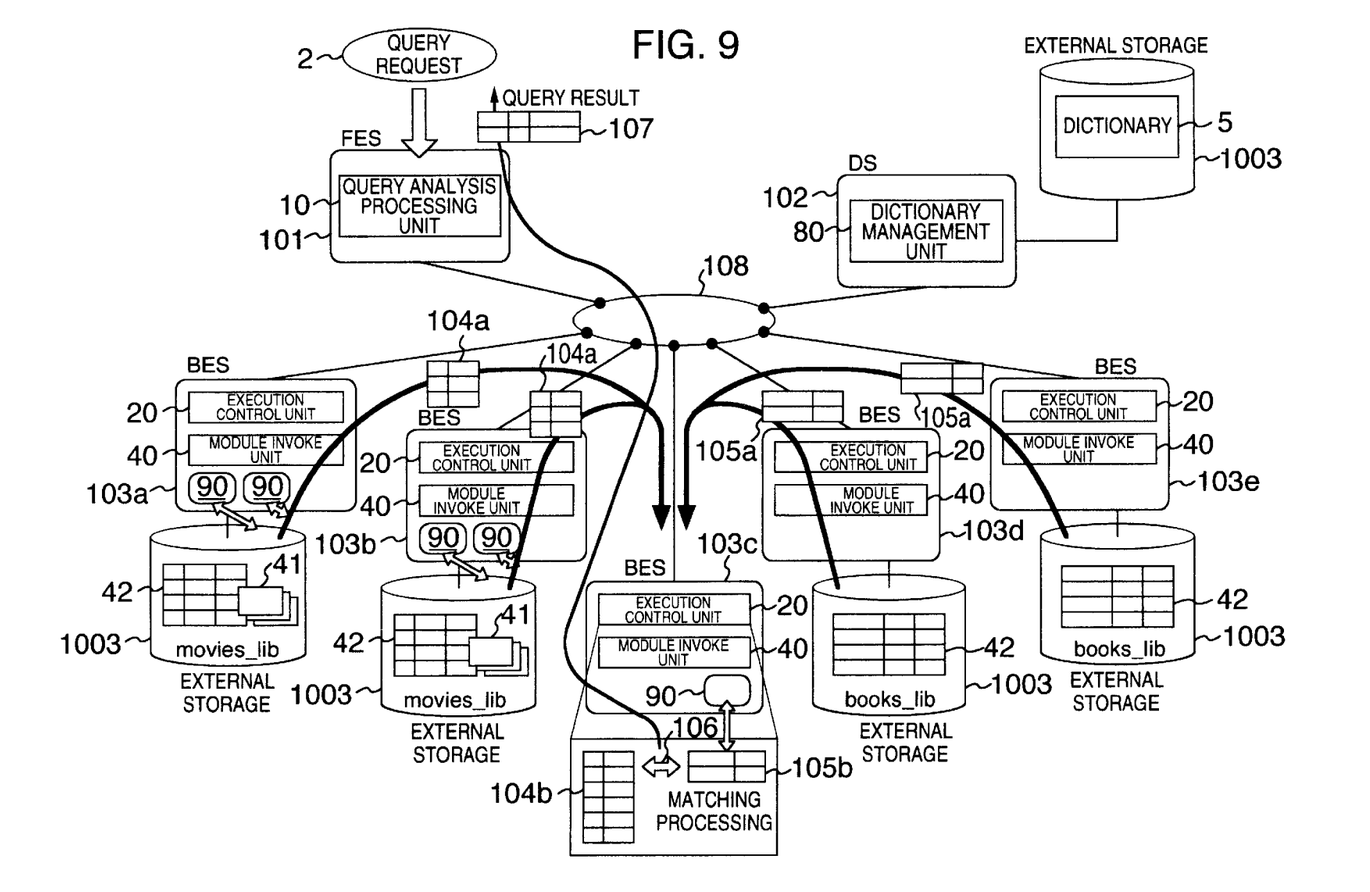
FIG. 9 is a diagram showing the outline of query execution processing of the embodiment.

FIG. 9 is a diagram showing the outline of the query execution processing of the present embodiment. FIG. 9 shows the outline of the query execution processing according to the execution procedure directive shown in FIGS. 7 and 8. The database environment in the present outline diagram is a parallel database environment in which the "movies_lib" of the table data 42 is divisionally stored and managed in BES 103a and BES 103b, whereas the "books_lib" of the table data 42 is divisionally stored and managed in BES 103d and BES 103e. FES 101, DS 102 and BES 103 are interconnected via a network 108. Via the network 108, query requests, execution procedure directives, intermediate processing results, and query results are exchanged in parallel.

First of all, in the server of the BES 103a and BES 103b, table data of the table "movies_lib" is accessed matter by matter and "guide" column data and title column data are taken out, in accordance with the partial details 720a of the query execution procedure directive of FIG. 7. Subsequently, by using the "guide" column data as a parameter, "_p_text_contains" of the UDT function implementation module 90 is invoked, and a decision is made on its result. If a condition is satisfied as a result of the condition decision, then "_text_extract1" is further invoked. In the present module, access to the DB resource 41 is conducted, a portion corresponding to the tag "text" is acquired. As represented by data 104a of FIG. 9, a row identifier for identifying its function result, title data, and table data, i.e., a row is transferred to the BES 103c which conducts the join processing. The processing heretofore described is repeated until the table data disappears. As for the result transfer processing, it is desirable to transfer a certain amount of data collectively by taking the cost concerning the transfer into consideration. In the BES 103c serving as a join server, the data 104a transferred from the BES 103a and BES 103b is merged as data 104b.

Concurrently with the above described processing of accessing the table "movies_lib", table data of the table "books_lib" is accessed matter by matter in the server of each of the BES 103*d* and BES 103*e*, in accordance with the partial details 730*a* of the query execution procedure directive of FIG. 8. The "guide" column data, "publish_year" column data, and "title" column data are thus taken out. Subsequently, a condition decision (=1997) for the "publish_year" column is conducted. If the condition is satisfied, then a row identifier for identifying title data and table data, i.e., a row is transferred to the BES 103*c* which conducts the join processing, as data 105*a* of FIG. 9. The processing heretofore described is repeated until the table data disappears. As for the result transfer processing, it is a matter of course that it is desirable to transfer a certain amount of data collectively by taking the cost concerning the transfer into consideration.

In the BES 103*c* serving as the join server, the data 105*a* transferred from the BES 103*d* and BES 103*e* is merged as data 105*b*.

And in the join server BES 103*c*, matching processing 106 of FIG. 9 is conducted in accordance with the partial details 710*a* of the query execution procedure directive. As regards table data further narrowed down by the matching processing, a module "_p_text_extract2" is invoked. Finally, its result ("TEXT_EXTRACT2 RESULT") and transferred "TEXT_EXTRACT2 RESULT" are returned to the user via the FES 101 as a query result 107.

The number of data matters narrowed down as a result of join is very small. Therefore, invoking the module "_p_text_extract2" which does not involve the DB resource access, in the join server in the final stage is a very efficient processing procedure which does not cause useless function invoke.

The processing of the flow chart heretofore described is executed as a program in the computer system shown in FIG. 2 as an example. However, the program is not restricted to be stored in an external storage physically direct-connected to the computer system as in the example of FIG. 2. The program can be stored in a storage medium which can be read and written by the computer, such as a hard disk device or a floppy disk device.

As described earlier, in the database processing system of the present embodiment, the user-defined function representing the behavior of the user-defined data type is made capable of efficiently accessing the DB resource specific to the UDT. As a result, the user can define varicolored UDTs.

As heretofore described, in the database processing system of the present embodiment, a module which accesses the specific DB resource is executed in a database processing apparatus in which the DB resource is stored and managed, whereas modules other than the module are executed in other database processing apparatuses. Therefore, database processing of accessing the specific DB resource can be conducted efficiently.

What is claimed is:

1. A method, in a database system including a front-end server, that is a logical unit of a database management system, for accepting a query from a user and analyzing the query and at least one back-end server, that is a logical unit of a database management system, for accessing data in a database, the front-end server and the back-end server being on different computers, for invoking a module to implement a user-defined function related to a data type in a query, and conducting processing, said method comprising the steps of:

storing, when an user defines a user-defined function, information whether a module for implementing the user-defined function accesses a specific database resource which is necessary data to estimate the user-defined function and which is not table data;

when analyzing a query given by a user to generate an execution procedure, if the user-defined function accesses said specific database resource which is necessary data to estimate the user-defined function and which is not table data, determining an execution procedure so as to invoke the module in the back-end server having said specific database resource which is necessary data to estimate the user-defined function and which is not table data, if the user-defined function does not access said specific database resource which is necessary data to estimate the user-defined function and which is not table data, determining an execution procedure so as to invoke the module in the front-end server.

2. A database processing method of according to claim 1, said database processing method further comprising the step of:

determining, when analyzing the query given by a user to generate the execution procedure, the execution procedure so as to invoke said module in a database processing apparatus having the lowest module execution frequency if said information indicates that the module does not access the specific database resource.

3. A database processing method of according to claim 1, said database processing method further comprising the step of:

determining, when analyzing the query given by a user to generate the execution procedure, the execution procedure so as to invoke said module in a database processing apparatus having no relation to the database processing apparatus storing and managing said database resource if said information indicates that the module does not access the specific database resource.

4. A database system, including a front-end server, that is a logical unit of a database management system, for accepting a query from a user and analyzing the query and at least one back-end server, that is a logical unit of a database management system, for accessing data in a database, the front-end server and the back-end server being on different computers, for invoking a module to implement a user-defined function related to a data type in a query, and conducting processing, said database system comprising:

a module definition information registration unit for storing information whether a module for implementing the user-defined function accesses a specific database resource which is necessary data to estimate the user-defined function and which is not table data;

a module execution procedure determination processing unit for analyzing a query given by a user, and if the user-defined function accesses specific database resource which is necessary to estimate the user-defined function and which is not table data, determining an execution procedure so as to invoke the module in the back-end server having the specific database resource, if the user-defined function does not access said specific database resource which is necessary data to estimate the user-defined function and which is not table data, determining an execution procedure so as to invoke the module in the front-end server.

5. A database processing apparatus according to claim 4, wherein said module execution procedure determination processing unit determines said execution procedure so as to invoke said module in a database processing apparatus having the lowest module execution frequency if said information indicates that the module does not access the specific database resource.

6. A database processing apparatus according to claim 4, wherein said module execution procedure determination processing unit determines said execution procedure so as to invoke said module in a database processing apparatus having no relation to the database processing apparatus storing and managing said database resource if said information indicates that the module does not access the specific database resource.

7. A medium for recording a program, said program causing a computer to function as a database system, including a front-end server module for accepting a query from a user and analyzing the query and at least one back-end server module for accessing data in a database, the front-end server module and the back-end server module being different modules, for invoking a module to implement a user-defined function related to a data type in a query, and conducting processing, said medium recording a program to cause a computer to function as:

a module definition information registration unit for storing information whether a module for implementing the user-defined function accesses a specific database resource which is necessary data to estimate the user-defined function and which is not table data;

a module execution procedure determination processing unit for analyzing a query given by a user, and if the user-defined function accesses a specific database resource which is necessary data to estimate the user-defined function and which is not table data, determining an execution procedure so as to invoke the module in the back-end server having said specific database resource which is necessary data to estimate the user-defined function and which is not table data, if the user-defined function does not access said specific database resource which is necessary data to estimate the user-defined function and which is not table data, determining an execution procedure so as to invoke the module in the front-end server.

8. A program for causing a computer to function as a database system, including a front-end server module for accepting a query from a user and analyzing the query and at least one back-end server module for accessing data in a database, the front-end server module and the back-end server module being different modules, for invoking a module to implement a user-defined function related to a data type in a query, and conducting processing, said program comprising:

a module definition information registration unit for storing information whether a module for implementing the user-defined function accesses a specific database resource which is necessary data to estimate the user-defined function and which is not table data;

a module execution procedure determination processing unit for analyzing a query given by a user, and determining an execution timing and an execution procedure so as to invoke said module in a database system storing and managing said specific database resource which is necessary data to estimate the user-defined function and which is not table data, if said information indicates that the module accesses said specific database resource which is necessary data to estimate the user-defined function and which is not table data; and a processing unit for, if the user-defined function accesses said specific database resource, determining an execution procedure so as to invoke the module in the back-end server having said specific database resource which is necessary data to estimate the user-defined function and which is not table data, if the user-defined function does not access a specific database resource which is not necessary to estimate the user-defined function and which is not table data, determining an execution procedure so as to invoke the module in the front-end server.

9. A user-defined function implementing method in a database system including front-end servers, that are logical units of a database management system and back-end servers, that are logical units of a database management system, each back-end server having a database resource, comprising the steps of:

registering a module for implementing a user-defined function with information on whether the user-defined function accesses said specific database resource which is necessary data to estimate the user-defined function and which is not table data, each specific database resource being part of a partitioned database and belonging to a specific back-end server;

accepting a query from a user;

checking if the query includes the user-defined function;

checking the registered information of the module for implementing the user-defined function included in the query, if the user-defined function existed in the query; and if the user-defined function accesses said specific database resource which is necessary data to estimate the user-defined function and which is not table data, determining an execution procedure so as to invoke the module in the back-end server having said specific database resource which is necessary data to estimate the user-defined function and which is not table data, if the user-defined function does not access a specific database resource, determining an execution procedure so as to invoke the module in the front-end server.

10. A database system comprising:

front-end servers, that are logical units of a database management system; and back-end servers, that are logical units of a database management system, each back-end server having a database resource, each database resource being part of a partitioned database, wherein the front-end server includes:

means for registering a module for implementing a user-defined function with information on whether the user-defined function accesses a specific database resource which is necessary data to estimate the user-defined function and which is not table data;

means for accepting a query from a user;

means for checking if the query includes the user-defined function;

means for checking the registered information of the module for implementing the user-defined function included in the query, if the user-defined function existed in the query; and means for, if the user-defined function accesses said specific database resource which is necessary data to estimate the user-defined function and which is not table data, determining an execution procedure so as to invoke the module in the back-end server having said specific database resource which is necessary data to estimate the user-defined function and which is not table data, if the user-defined function does not access said specific database resource which is necessary data to estimate the user-defined function and which is not table data, determining an execution procedure so as to invoke the module in the front-end server.

* * * * *